3,139,432
PYRIDO[2,3-d]PYRIMIDINE-2,4,5,7-TETRAONES
Homer C. Scarborough, Evansville, Ind., assignor to Mead
 Johnson & Company, Evansville, Ind., a corporation of
 Indiana
No Drawing. Filed June 24, 1963, Ser. No. 290,205
13 Claims. (Cl. 260—256.4)

The present invention is concerned with heterocyclic compounds of Formula I and with the alkali metal salts thereof.

FORMULA I

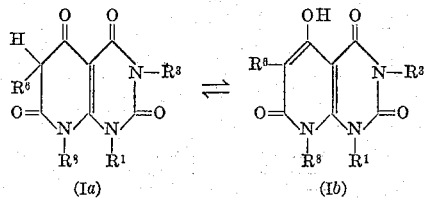

In these formulas and throughout the present patent application, $R^1$, $R^3$, and $R^8$ refer to hydrogen atoms or methyl groups, and $R^6$ refers to a hydrogen atom or a lower alkyl group having up to about 6 carbon atoms. Formula I represents equivalent tautomeric forms of the same compound, (Ia) being the 5-keto form and (Ib) being the 5-enol form. The separate forms under certain conditions may co-exist in tautomeric equilibrium, as shown. As is usual in the art, the keto and enol forms (Ia and Ib) are regarded as equivalents for practical purposes. When one or more of $R^1$, $R^3$, and $R^8$ are hydrogen, other enolic forms involving one or more of the oxygen atoms in the 2, 4, and 7 positions are sometimes formed. Each such tautomer is considered part of the present invention.

The above substances comprise a new class of chemical compounds known as pyridol[2,3-d]pyrimidine-2,4,5,7-[1H,3H,8H]tetraones (Formula Ia) or 5-hydroxypyrido [2,3-d]pyridimidine-2,4,7-[1H,3H,8H]triones (Formula Ib). They bear a functional relationship to the biologically active purines in which the imidazoline ring thereof is replaced by the dioxo pyridine ring of similar acidic character.

The products of the present invention are active pharmacologic agents which have been shown by animal tests to variously possess central nervous system stimulating, bronchodilator, uricosuric, and anti-inflammatory properties when administered in doses ranging from 50 to 400 mg./kg. of body weight.

The compounds of Formula I are prepared by reacting a 4-aminouracil or 4-methylaminouracil, either of which if desired may bear methyl groups in the 1- and/or 3-positions, with malonic acid or an alkyl mono-substituted malonic acid in the presence of a condensing agent.

The process is illustrated by Equation a.

EQUATION a

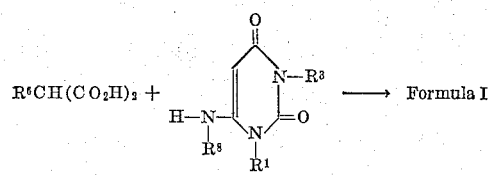

Suitable condensing agents include the lower alkanoic anhydrides such as acetic anhydride, propionic anhydride, or butyric anhydride. Acetic anhydride is the preferred condensing agent. In some instances an inert organic liquid solvent may be advantageously employed to assist in the formation of a homogeneous reaction medium. Acetic acid is preferred for the latter purpose. The reaction takes place spontaneously on mixing of the reactants and condensing agent, as is evidenced by the evolution of heat. It is preferred, however, to carry out the process at somewhat elevated temperatures, temperatures in the range of 30–100° C. being preferred. At temperatures substantially in excess of 100° C. reduced yields are sometimes obtained as a result of decomposition of the malonic acid reactant.

The following examples are provided to further illustrate the manner of practicing the present invention. They are not to be considered the sole embodiments thereof, however, and are provided only for illustrative purposes. Corrected melting points are reported.

Example 1

1,3,6,8-tetramethylpyrido[2,3 - d] - pyrimidine-2,4,5,7-[1H,3H,6H,8H]tetraone.—A mixture of 8.45 g. (0.05 mole) of 1,3-dimethyl-4-(methylamino)uracil, 7.1 g. of methylmalonic acid, 11.3 ml. (0.12 mole) of acetic anhydride and 10 ml. of acetic acid is heated on the steam bath for 2 hrs. During this time the suspended reactants dissolve and the solution boils gently. The solution is then cooled in an ice bath with the formation of a precipitate. The crystallized product is collected by filtration. The crystalline material is recrystallized from acetonitrile yielding the purified product in 48% yield based on uracil reactant, M.P. 259.5–260.5° C.
Analysis: C, 52.66; H, 5.22; N, 16.90.

Examples 2–7

The procedure of Example 1 is repeated employing the following reactants as described for 1,3-dimethyl-4-(methylamino)uracil and methylmalonic acid in that example.

Example 2:
 4-aminouracil
 Malonic acid
Example 3:
 1,3-dimethyl-4-aminouracil
 Malonic acid
Example 4:
 1,3-dimethyl-4-(methylamino)uracil
 Malonic acid
Example 5:
 1,3-dimethyl-4-aminouracil
 methylmalonic acid
Example 6:
 1,3-dimethyl-4-aminouracil
 n-Butylmalonic acid
Example 7:
 1,3-dimethyl-4-(methylamino)uracil
 n-Butylmalonic acid The formulas, analyses, percent yield, and solvents used for recrystallization of the products produced by Examples 2 through 7 are arranged in the following table. Each of the substances described in Examples 1 through 7 is soluble in 5% aqueous sodium hydroxide and is reprecipitated therefrom by neutralization of the solution with acid. These products are insoluble in 10% aqueous sodium carbonate solution.

The products of Examples 1, 3, 4, 5, and 6 were concluded to exist in the 5-enol form (Formula Ib) when dissolved in dimethylsulfoxide. Solutions thereof in dimethylsulfoxide having concentrations of 10% (w./v.) exhibited resonance at 745 cycles/sec. which value was not altered in frequency by dilution of the solution. This is characteristic of an intramolecularly hydrogen-bonded hydroxyl group. The products of Examples 3 and 4 in which $R^6$ is hydrogen each exhibited resonance at 358 and 338 cycles/sec. also, which is characteristic of a hydrogen atom attached to a carbon-carbon double-bond. The products of Examples 1 and 5 in which $R^6$ is methyl exhibited resonance at 115 and 113 cycles/sec. which is characteristic of a methyl group attached to a carbon-carbon double-bond.

and the alkali metal salts thereof, wherein $R^6$ is selected from the group consisting of hydrogen and lower alkyl, and $R^1$, $R^3$, and $R^8$ are selected from the group consisting of hydrogen and methyl.

2. 1,3 - dimethylpyrido[2,3 - d]pyrimidine - 2,4,5,7-[1H,3H,6H,8H]tetraone.

Examples 2–7

PYRIDO[2,3-d]PYRIMIDINE-2,4,5,7-[1H,3H,6H,8H]TETRAONES AND 5-ENOL EQUIVALENTS

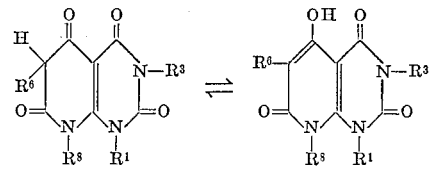

| Example No. | $R^1$ | $R^3$ | $R^6$ | $R^8$ | M.P.(° C.) | Yield, Percent | Formula | Recrystallization Solvent | Analysis | | |
|---|---|---|---|---|---|---|---|---|---|---|---|
| | | | | | | | | | C | H | N |
| 2 | H | H | H | H | * | 82 | $C_7H_5N_3O_4$ | a | | | 21.64 |
| 3 | $CH_3$ | $CH_3$ | H | H | 280–282.5 | 45 | $C_9H_9N_3O_4$ | cd, e | 48.48 | 4.11 | 18.91 |
| 4 | $CH_3$ | $CH_3$ | H | $CH_3$ | 220.5–222.5 | 46.5 | $C_{10}H_{11}N_3O_4$ | b, c | 50.64 | 4.66 | 17.68 |
| 5 | $CH_3$ | $CH_3$ | $CH_3$ | H | 287.5–289.5 | 58 | $C_{10}H_{11}N_3O_4$ | d, b | 50.91 | 4.76 | 17.82 |
| 6 | $CH_3$ | $CH_3$ | $CH_3$—$(CH_2)_2CH_2$ | H | 195–196 | 24 | $C_{13}H_{17}N_3O_4$ | b | 55.55 | 6.27 | 15.19 |
| 7 | $CH_3$ | $CH_3$ | $CH_3$—$(CH_2)_2CH_2$ | $CH_3$ | 119–120 | 38 | $C_{14}H_{19}N_3O_4$ | f, gh | 57.14 | 6.48 | 14.21 |

*Failed to melt at 360° C.

a, not recrystallized, insoluble organic solvents; b, acetonitrile; c, butanone; d, dimethylformamide; e, acetic acid; f, methyl alcohol; g, benzene; h, heptane.

Example 8

1,3,8 - trimethylpyrido[2,3-d] - pyrimidine - 2,4,5,7-[1H,3H,6H,8H]tetraone sodium salt.—A sample of the product of Example 4 is dissolved in one chemical equivalent of 5% aqueous sodium hydroxide and the resulting solution is concentrated to dryness. The residue remaining is the sodium salt of the starting tetraone.

The sodium, potassium, and lithium salts of the products of Examples 1 through 7 are prepared and recovered in the same fashion. They are useful as intermediates in substitution reactions employing alkyl and aralkyl esters of strong acids such as alkyl halides and sulfates, and alkyl- and arylisocyanates.

This application is a continuation-in-part of my co-pending application, Serial No. 214,187, filed August 2, 1962, and now abandoned.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of

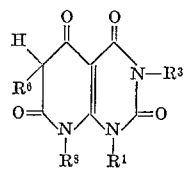

3. 1,3,8 - trimethylpyrido[2,3 - d]pyrimidine - 2,4,5,7-[1H,3H,6H,8H]tetraone.

4. 1,3,6 - trimethylpyrido[2,3 - d]pyrimidine - 2,4,5,7-[1H,3H,6H,8H]tetraone.

5. 1,3 - dimethyl - 6 - (n - butyl)pyrido[2,3-d]pyrimidine-2,4,5,7-[1H,3H,6H,8H]tetraone.

6. 1,3,8 - trimethyl - 6 - (n-butyl)pyrido[2,3-d]pyrimidine-2,4,5,7-[1H,3H,6H,8H]tetraone.

7. Pyrido[2,3-d]pyrimidine - 2,4,5,7 - [1H,3H,6H,8H] tetraone.

8. A compound selected from the group consisting of

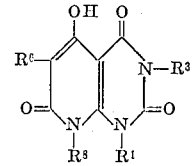

and the alkali metal salts thereof, wherein $R^6$ is selected from the group consisting of hydrogen and lower alkyl, and $R^1$, $R^3$, and $R^8$ are selected from the group consisting of hydrogen and methyl.

9. 5-hydroxy - 1,3 - dimethylpyrido[2,3 - d]pyrimidine-2,4,7-[1H,3H,8H]trione.

10. 5 - hydroxy - 1,3,8 - trimethylpyrido[2,3-d]pyrimidine-2,4,7-[1H,3H,8H]trione.

11. 5-hydroxy - 1,3,6 - trimethylpyrido[2,3-d]pyrimidine-2,4,7-[1H,3H,8H]trione.

12. 5-hydroxy - 1,3 - dimethyl - 6 - (n-butyl) - pyrido[2,3-d]pyrimidine-2,4,7-[1H,3H,8H]trione.

13. 5-hydroxy - 1,3,8 - trimethyl - 6 - (n-butyl)pyrido[2,3-d]pyrimidine-2,4,7-[1H,3H,8H]trione.

No references cited.

UNITED STATES PATENT OFFICE
CERTIFICATE OF CORRECTION

Patent No. 3,139,432

June 30, 1964

Homer C. Scarborough

It is hereby certified that error appears in the above numbered patent requiring correction and that the said Letters Patent should read as corrected below.

Column 1, line 38, for "pyridol" read -- pyrido --; line 39, for "[1H,3H,8H]" read -- [1H,3H,6H,8H] --.

Signed and sealed this 17th day of November 1964.

(SEAL)
Attest:

ERNEST W. SWIDER
Attesting Officer

EDWARD J. BRENNER
Commissioner of Patents